March 10, 1953 W. W. PHILIPP 2,630,906
SILAGE DISTRIBUTOR
Filed Feb. 19, 1951 2 SHEETS—SHEET 1
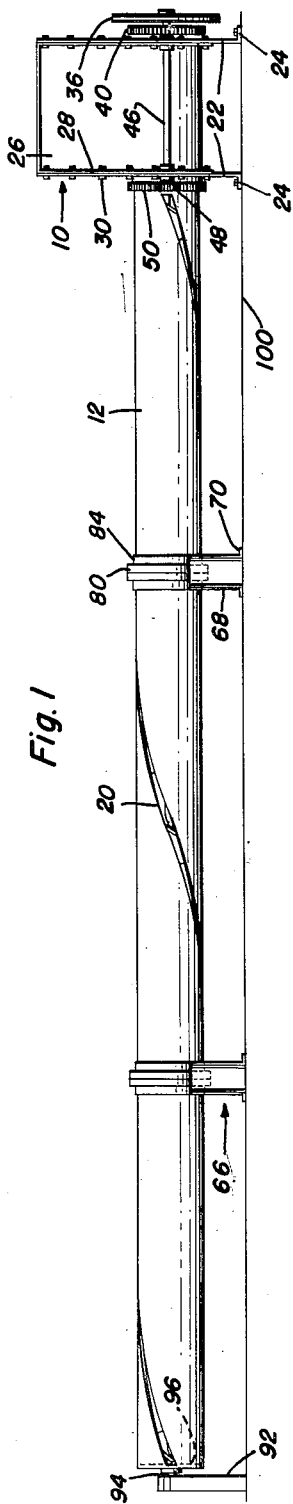
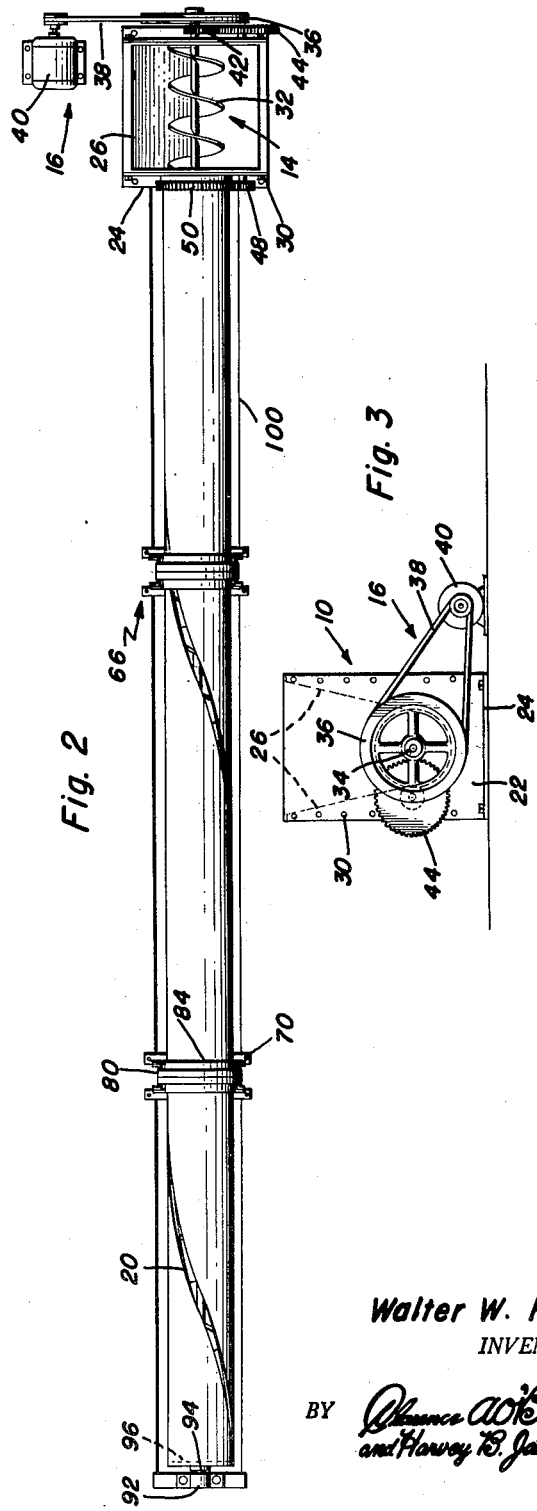
Walter W. Philipp
INVENTOR.
BY
Attorneys March 10, 1953     W. W. PHILIPP     2,630,906
SILAGE DISTRIBUTOR Filed Feb. 19, 1951     2 SHEETS—SHEET 2

Walter W. Philipp
INVENTOR.

Patented Mar. 10, 1953

2,630,906

UNITED STATES PATENT OFFICE 2,630,906

SILAGE DISTRIBUTOR

Walter W. Philipp, Sheldon, Wis.

Application February 19, 1951, Serial No. 211,630

3 Claims. (Cl. 198—64)

This invention relates generally to conveyors and more particularly to a rotary screw conveyor assembly wherein both the screw and the tube enclosing the screw rotate about their common axis, the tube having a spiral slot so that the material is distributed longitudinally of the tube.

The primary object of the invention is to provide means for distributing silage and other material along a receiver of considerable length.

Another object of the invention, ancillary to the preceding object, is to provide a rotary screw distributor assembly particularly well adapted for distributing silage and other feeds along a manger of considerable length.

Another object of this invention is to provide a distributor assembly wherein any tendency to clog, when handling such materials as are mentioned above, is eliminated due to the fact that the tube as well as the screw feeder rotates.

Yet another object of this invention is to provide a rotary screw distributor assembly which will distribute the material fed thereinto with the expenditure of minimum power while assuring reasonably even distribution of the material throughout at least a portion of the length of the tube, it being understood that the length of the tube can be changed by adding or deleting sections, and the rate of feeding, as well as rate of rotation of the tube, can be utilized to control the rate of distribution of material.

Another object of the invention is to provide simple yet efficient means for mounting both the screw feeder and the tube for coaxial rotation, while providing for the power driving of both.

A last object to be mentioned specifically is to provide a rotary screw distributor assembly which is safe as well as convenient to operate, which is relatively inexpensive and practicable to manufacture and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is a side elevational view of the assembled device;

Figure 2 is a top plan view of the assembled device;

Figure 3 is an end elevational view, as taken from the right hand end of Figure 2;

Similar characters of reference designate similar or identical elements and portions throughout the specification and throughout the different views in the drawings.

Figure 4:
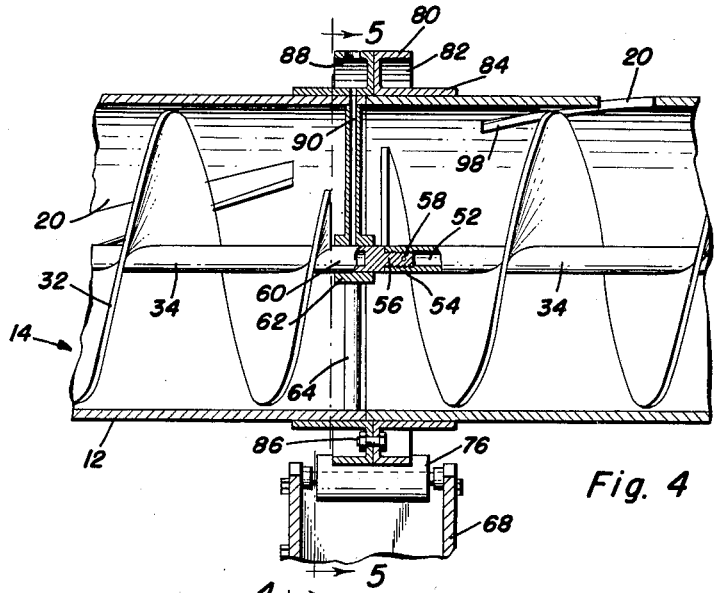
Figure 4 is an enlarged vertical sectional view taken on the section line 4—4 in Figure 5.
Figure 5:
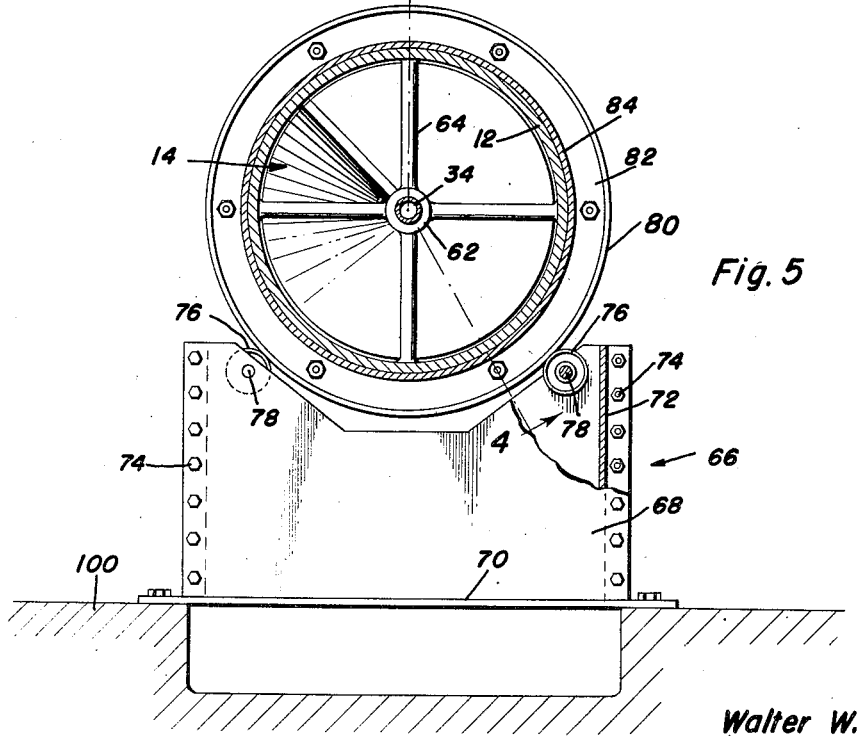
Figure 5 is a vertical cross sectional view taken substantially on the line 5—5 in Figure 4.

Referring now to the drawings in detail, this invention includes a hopper, generally indicated at 10, a tube 12 and a rotary screw feeder generally indicated at 14, together with certain other parts which will be described more particularly as this disclosure proceeds. Another feature of this invention concerned with the general concept thereof is the provision of spiral slots 20 in the tube 12, one such slot of discontinuous character being illustrated in the drawings.

The hopper 10 is comprised of a pair of opposing vertical side plates 22 having attachment flanges 24, and a generally V-shaped plate 26 having flanges 28 which are secured to the plates 22 by bolts or rivets indicated at 30. The screw feeder 14 has a spiral vane 32 and a tubular axis member 34 upon which the spiral vane 32 is mounted, as by welding, and one end of the axis member 34 carries a drive pulley 36. A belt 38 connects this drive pulley 36 with a motor diagrammatically indicated at 40, and it will be understood that a portion of the screw feeder 14 traverses the hopper 10 in the bight portion of the V-shaped plate 26, one end of the axis member extending through one of the side plates 22 of the hopper and carrying the drive pulley 36, while the other end of the screw conveyor extends through the opposing side plate 22, which is suitably apertured, into the adjacent end of the tube 12. It will be clear that operation of the spiral feeder 14 will carry material from the hopper 10 into the tube 12.

The tube 12 is also driven, a pinion 42 being secured to the axis member 34, immediately inside the drive pulley 36 and this pinion 42 drives a gear 44 mounted on a shaft 46, best shown in Figure 1, and another pinion 48 on the opposite end of the shaft 46 drives a ring gear 50 rigidly secured to the adjacent end of the tube 12, this assembly constituting a set of speed producing gears designed to drive the tube 12 at a slower rate than the screw feeder 14.

The screw feeder has its axis member 34 hollow as indicated at 52 and the screw feeder is provided in sections as will best be understood from a consideration of Figure 4, one end of each section of the axis member having an internally threaded portion 54 to receive an externally threaded and reduced end portion 56 of the next section of the screw feeder. A set screw 58 may be used to prevent inadvertent unscrewing of the threadedly connected sections of the axis member 34. A portion 60 of at least certain of the sections of the axis member 34 will function as a journal within a bearing 62 supported by a spider 64 carried by an adjacent section of the tube 12, it being understood that the tube 12 is also provided in sections as will be described more fully hereinafter.

Especially designed pillow blocks, generally indicated at 66 are provided to support the tube 12. Each pillow block comprises a pair of opposing vertical plates 68 having attachment flanges 70, and vertical channel plates 72 are secured by bolts or rivets, indicated at 74, to the plates 68. Each pillow block has a pair of opposing parallel anti-friction devices illustrated as rollers 76, journaled as indicated at 78 on the side plates 68. These rollers 76 engage the outer flange 80 of a collar 82 comprised of two similar L-shaped channel members having their larger flange portions 84 secured to the abutting ends of sections of the tube 12, as by welding. As mentioned above, each collar is composite, or comprised of two similar parts, and the bight portions of these L-shaped channels of the collar are connected together by bolts 86, as indicated in Figure 4.

Since in devices of this character the lubrication of bearings is very important, an oil hole 88 is provided in the outer flange 80 of each collar and one arm of each spider 64 is longitudinally drilled as indicated at 90, in registration with the oil hole 88 so that oil may be fed to the corresponding bearing 62, all as best illustrated in Figure 4.

As stated above, both the screw feeder and the tube are provided in sections, the number of sections being determined and dictated by the particular environment and function of the device, but in all cases the section of the tube 12 remote from the hopper 10 will be provided with a fixed end plate 96 carrying a stub spindle 94 which is journaled in a cushion block or other suitable bearing structure diagrammatically indicated at 92. A refinement in structure avoiding unnecessary accumulation of distributed material adjacent to the pillow blocks 66 is indicated at 98 in Figure 4 by the disposition of the corresponding end 98 of the slot 20 in that section of the tube 12 on the side of the corresponding pillow block adjacent to the hopper 10, this end 98 being spaced slightly from the pillow block 66 and toward the hopper 10. This arrangement prevents the material from any possible piling up at the cushion blocks 66.

The operation of this invention will be clearly understood from a consideration of the foregoing description and mechanical details already set forth, taken in connection with the drawings and the above recited objects.

As stated before, the device will ordinarily be mounted in a manger or the like elongated receptacle, diagrammatically indicated at 100, and the material fed into the hopper will be distributed more or less evenly along the length of the tube 12, the material escaping through the spiral slot 20.

Minor modifications of the disclosed form may be resorted to without departing from the spirit and scope of this invention.

Having described the invention, what is claimed as new is:

1. A rotary screw distributor assembly comprising a tube having a spiral slot extending along the tube, and a driven screw feeder mounted coaxially within the tube, said tube being also rotated about its axis, said feeder having an axis member and a spiral vane in sections spaced apart slightly longitudinally of the tube, said axis member having portions extending beyond an end of said spiral vane, and said tube carrying a bearing supporting said extending portions of said axis member.

2. A rotary screw distributor assembly comprising a sectional tube having spiral slots extending substantially the length of each section, a sectional driven screw feeder mounted coaxially within the tube, a hopper at one end of said tube and one end of said feeder extending into said hopper, axial bearings supporting said feeder secured to the abutting ends of said tube sections, said feeder sections being rotatably journaled in said bearings to permit independent rotation of said feeder and said tube, pillow blocks supporting the intermediate sections of said tube, rollers journaled on said pillow blocks and engaging the outer surface of said tube sections and means rotatably driving said feeder and said tube at different rates.

3. The combination of claim 2, wherein said means includes a ring gear on said tube and reduction gearing mounted on said hopper and operatively connected with said ring gear.

WALTER W. PHILIPP.

REFERENCES CITED

The following references are of record in the file of this patent:

UNITED STATES PATENTS

| Number | Name | Date |
|---|---|---|
| 126,826 | Milton | May 14, 1872 |
| 371,609 | Marr | Oct. 18, 1887 |
| 2,067,583 | Stark | Jan. 12, 1937 |
| 2,360,776 | Kozak et al. | Oct. 17, 1944 |
| 2,545,141 | Escher | Mar. 13, 1951 |